(12) United States Patent  (10) Patent No.: US 8,014,009 B2
Hardy, Jr. et al.  (45) Date of Patent: Sep. 6, 2011

(54) SYSTEM AND METHOD FOR PRINTING AT LEAST ONE DIGITIZED IMAGE TO A DIGITAL MULTIMEDIA PRESENTATION APPLIANCE (75) Inventors: William C. Hardy, Jr., Fairport, NY (US); Michael A. Butler, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1156 days.

(21) Appl. No.: 11/800,582

(22) Filed: May 7, 2007

(65) Prior Publication Data

US 2008/0278743 A1 Nov. 13, 2008

(51) Int. Cl.
*G06F 15/00* (2006.01)
*G06F 17/00* (2006.01)
(52) U.S. Cl. ........................ 358/1.14; 715/209
(58) Field of Classification Search .......... 358/1.14, 358/1.13, 1.16, 1.15, 1.18, 2.1, 1.8, 1.9, 1.1, 358/504; 715/781, 246, 209, 205, 738; 709/203, 709/217, 209; 707/769, 748, 779; 382/209, 382/217; 455/445, 411, 422.1; 348/836, 333.01, 500
See application file for complete search history.

(56) References Cited

U.S. PATENT DOCUMENTS 7,861,169 B2 * 12/2010 Hull et al. ..................... 715/704

\* cited by examiner

*Primary Examiner* — Saeid Ebrahimi Dehkordy
(74) *Attorney, Agent, or Firm* — Fay Sharpe LLP (57) ABSTRACT A digital multimedia presentation appliance is provided having a display for displaying at least one digitized image. The digital multimedia presentation appliance further includes a processor configured to communicate and receive commands, including a digital multimedia presentation appliance print job command, from an external processor capable of executing a software application program for displaying a printing utility. The processor executes a program having instructions for processing the print job command and displaying the at least one digitized image by the display of the digital multimedia presentation appliance. The print job command is transmitted after selection of a digital multimedia presentation appliance printing icon corresponding to the digital multimedia presentation appliance following selection of the printing utility to print the at least one digitized image.

23 Claims, 5 Drawing Sheets

SYSTEM AND METHOD FOR PRINTING AT LEAST ONE DIGITIZED IMAGE TO A DIGITAL MULTIMEDIA PRESENTATION APPLIANCE

BACKGROUND

The present disclosure relates to data processing and network systems, and more particularly, to a system and method for printing, i.e., transferring and displaying, at least one digitized image to a digital multimedia presentation appliance.

Digital multimedia presentation appliances, such as digital picture frames, digital televisions and computer monitor displays, enable users to display digitized images which are obtained from sources, such as the world wide web, a paid service, a memory card, or a computing device (such as a digital camera), connected to the digital multimedia presentation appliance wirelessly or non-wirelessly, e.g., via a universal serial bus (USB) connection, and other means. Displaying a digitized or digital image on a display of a digital multimedia presentation appliance generally requires performing a workflow that is not familiar to most personal computer users. One workflow that is familiar to personal computer users is using a printing utility available on most software application programs for selecting a particular printer and printing to the particular printer.

SUMMARY

It is an aspect of the present disclosure to provide a digital multimedia presentation appliance, such as a digital picture frame, digital television and computer monitor display, and accompanying workflow method enabling a user to use a printing utility available in, or for use with most software application programs for selecting the digital multimedia presentation appliance and printing thereto, i.e., transferring and displaying a digitized image on a display of the digital multimedia presentation appliance.

It is a further aspect of the present disclosure to manage the distribution of documents which are printed (or broadcast faxed), i.e., transferred and displayed, to a plurality of digital multimedia presentation appliances using a printing utility or electronic facsimile utility with operational behavior similar to those commonly available in, or for use with, most software application programs.

It is a further aspect of the present disclosure to manage the security of documents which are printed, i.e., transferred and displayed, to a digital multimedia presentation appliance using a printing utility with operational behavior similar to those commonly available in, or for use with, most software application programs.

It is also an aspect of the present disclosure to provide a customization database or other suitable data structure, in association with a storage capable device for customizing digitized images by adding custom content thereto prior to the images being printed, i.e., transferred and displayed, to a plurality of digital multimedia presentation appliances. The digitized images are uniquely customized for each of the plurality of digital multimedia presentation appliances prior to being displayed by the respective digital multimedia presentation appliance.

In particular, the present disclosure provides a digital multimedia presentation appliance, such as a digital picture frame, digital television and computer monitor display, having a display for displaying at least one digitized image. The digital multimedia presentation appliance further includes a processor configured to communicate and receive data and commands, including a digital multimedia presentation appliance print job command, from an external processor capable of executing a software application program for displaying a printing utility. The digital multimedia presentation appliance processor executes a program having instructions for processing the print job command corresponding to the at least one digitized image and displaying the at least one digitized image by the display of the digital multimedia presentation appliance. The external processor generates the multimedia presentation appliance print job command and transmits the multimedia presentation appliance print job command to the multimedia presentation appliance corresponding to a multimedia presentation appliance printing icon displayed by the printing utility.

The digital multimedia presentation appliance further includes a memory module configured to store the at least one digitized image capable of being displayed by the display of the digital multimedia presentation appliance. The memory module can be part of the processor or a separate unit in operative communication with the processor, such as a removable memory card, flash memory module, or remote storage location accessible via wireless or non-wireless communication.

The digital multimedia presentation appliance further may optionally include a user interface; the user interface optionally including any of a key pad and the digital multimedia presentation appliance display.

The present disclosure further provides a digital multimedia presentation appliance printing system having at least one digital multimedia presentation appliance. The at least one digital multimedia presentation appliance includes a display for displaying at least one digitized image and a processor. The system further includes a computing device, such as a personal computer, having a processor in operative communication with the at least one digital multimedia presentation appliance via a communications link, such as a network connection. The computing device processor is configured for executing instructions of a software application program for generating a digital multimedia presentation appliance print job command and transmitting the print job command to the at least one digital multimedia presentation appliance via the communications link after selection of a digital multimedia presentation appliance printing icon, or other appropriate printing identifier, corresponding to the at least one digital multimedia presentation appliance following selection of a printing utility. The processor of the at least one digital multimedia presentation appliance is configured to receive the print job command, process the print job command and display the at least one digitized image corresponding to the print job command on the display of the at least one digital multimedia presentation appliance.

Additionally, the present disclosure provides a method for displaying at least one digitized image on a display of a digital multimedia presentation appliance. The method includes executing a printing utility on a computing device in operative communication with the digital multimedia presentation appliance; displaying at least a multimedia presentation appliance printing icon corresponding to the multimedia presentation appliance on a display of the computing device; selecting the multimedia presentation appliance printing icon corresponding to the multimedia presentation appliance; generating a multimedia presentation appliance print job command corresponding to the at least one digitized image; transmitting the multimedia presentation appliance print job command to the multimedia presentation appliance via a communications link; receiving the multimedia presentation appliance print job command corresponding to the at least one digitized image by a processor of the multimedia presentation appliance; processing the multimedia presentation appliance print job command by the processor of the multimedia presentation appliance; and displaying the at least one digitized image corresponding to the multimedia presentation appliance print job command on the display of the multimedia presentation appliance.

BRIEF DESCRIPTION OF THE DRAWINGS

Other features and embodiments of the present disclosure are described herein below with reference to the figures wherein.

DETAILED DESCRIPTION

A digital multimedia presentation appliance, such as a digital picture frame, digital television and computer monitor display, is provided by the present disclosure having a display for displaying at least one digitized image. The digital multimedia presentation appliance further includes a processor configured to communicate and receive commands, including a digital multimedia presentation appliance print job command, from an external processor capable of executing a software application program for displaying a printing utility. The digital multimedia presentation appliance processor includes a series of instructions capable of being executed by the processor for processing the print job command and displaying the at least one digitized image by the display of the digital multimedia presentation appliance. The print job command is generated by the external processor and transmitted to a digital multimedia presentation appliance selected using a printing utility. It is envisioned that the printing utility would display a printing icon for selection, the printing icon corresponding to the digital multimedia presentation appliance.

In accordance with the present disclosure, and as is well known to those skilled in the art, while the print utility may operate as a part of, or in combination with, a software application, the printing utility may also exist as a standalone software application. Further, in accordance with the present disclosure, the print utility may utilize a variety of means familiar to users of computing devices to transfer one or more digitized images to a digital multimedia presentation appliance. By way of example, and not limitation, the print utility may comprise, or consist of a facsimile utility, whereby the print job command is transmitted to a digital multimedia appliance following selection of a facsimile utility, including a broadcast facsimile utility. Further, in accordance with the present disclosure, the print utility may comprise, or consist of a print preview utility, whereby the print job command can be transmitted to a digital multimedia appliance following selection of a print preview utility. Additionally, in accordance with the present disclosure the print utility may comprise, or consist of a scan-to-digital multimedia presentation appliance utility, whereby the print job command can be transmitted to a digital multimedia appliance following selection of scan-to-digital multimedia presentation appliance utility. The scan-to-digital multimedia presentation appliance utility provides for scanning a document and generating a digital multimedia presentation appliance print job command for transferring and displaying the scanned document on a display of the digital multimedia presentation appliance. Accordingly, one can envision other utilities and applications for generating the print job command for printing, i.e., transferring and displaying an image, to a digital multimedia presentation appliance and for printing a print job command that may be stored on a computing device, i.e., transferring and displaying an image, to a digital multimedia presentation appliance, all of which are understood to fall within the scope of the print utility herein disclosed.

Even though the detailed description which follows describes printing to a digital picture frame (DPF) in conjunction with the figures for exemplary purposes, any other digital multimedia presentation appliance, such as digital televisions and computer monitor displays, can be utilized, instead of the DPF, for printing on a display thereof, i.e., transferring and displaying images thereto, in accordance with the present disclosure. Therefore, the present disclosure should not be limited to digital picture frames. As used herein multimedia refers to still and moving images or frames.

In accordance with the present disclosure, the digital picture frame as shown by the system diagram of FIG. 1 and designated generally by reference numeral 10 is configured to be interfaced with a computing device 12, such as a personal computer, PDA, mobile computing device, etc., for receiving DPF print job commands from the computing device as further described below. A DPF print job command is defined herein as an instruction command transmitted to a digital picture frame (DPF) 10 instructing the DPF 10 to process and display an image. The image can include a graphic, photograph, alphanumeric text, link, such as a URL and other file mapping data structure, and combinations thereof. The image can be transferred simultaneously with the DPF print job command (image and DPF print job command transmitted within the same data packet) or non-simultaneously (image and DPF print job command transmitted within different data packets).

The DPF print job command may further include other instructions configured for execution by the DPF 10 besides processing and displaying the image, such as storing a document transmitted thereto, temporarily buffering a file transmitted to a printer via the DPF 10, and other instructions envisioned by one skilled in the art. It is also envisioned that the DPF print job command may include instructions for processing and playing back an audio, video or audiovisual clips by the DPF 10. Therefore, the present disclosure is not limited to only processing and displaying images.

Additionally, the DPF print job command may include instructions capable of being processed by the DPF for fine tuning the display of the image in accordance with the model of the DPF and/or DPF characteristics, such as the type of the DPF display (LCD, plasma, high definition, color, monochrome, widescreen, etc.).

Figure 1:
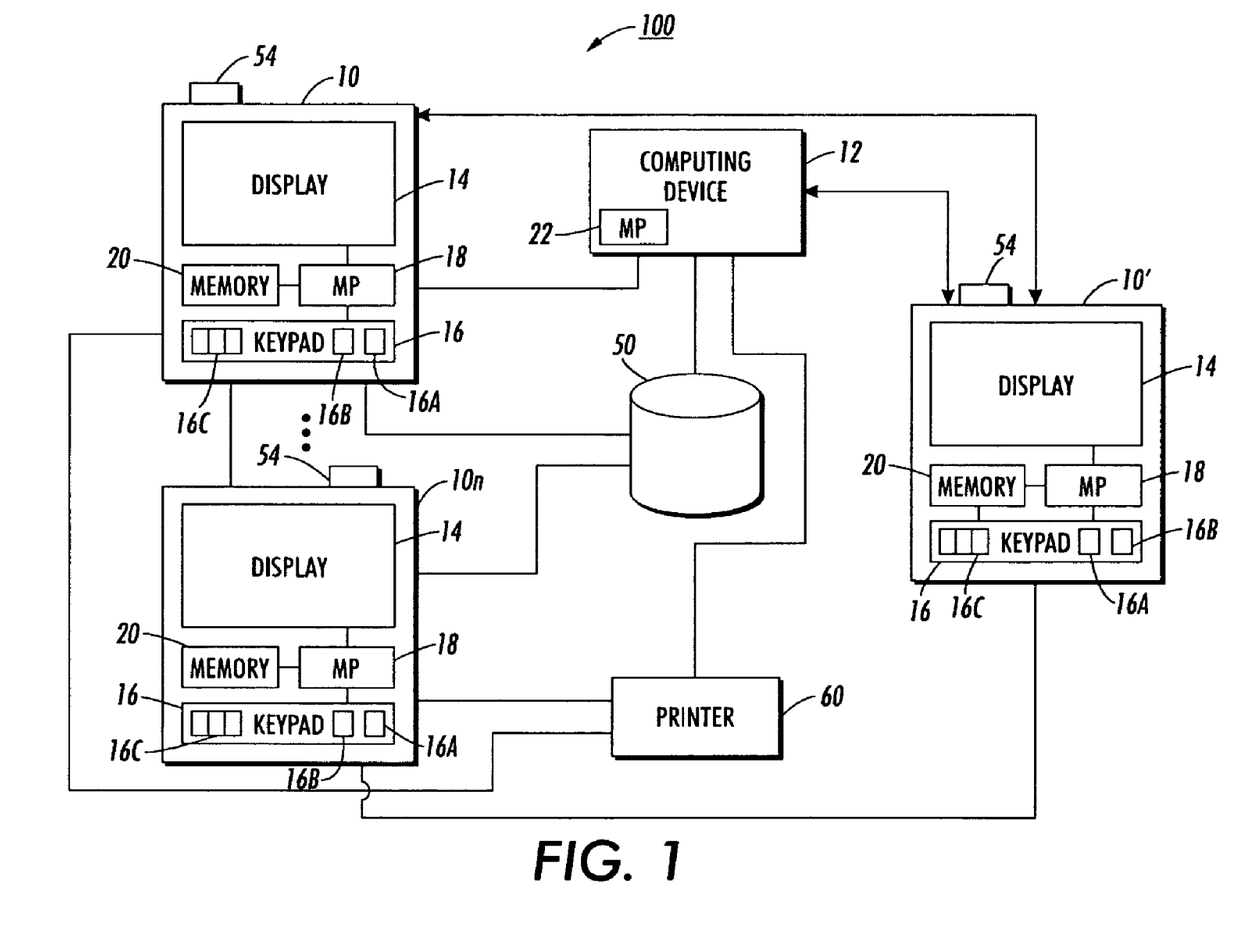
FIG. 1 is a block diagram of a digital multimedia presentation appliance printing system for printing, i.e., transferring at least one digitized image to at least one of a plurality of digital multimedia presentation appliances, and displaying the at least one digitized image by a display of at least one of the plurality of digital multimedia presentation appliances, according to the present disclosure.

With continued reference to FIG. 1 and in accordance with the present disclosure, the DPF 10 is part of a digital picture frame printing system designated by reference numeral 100. The system 100 includes the computing device 12 capable of printing, i.e., transferring a digitized image for display by the display 14 of the digital picture frame 10, to at least one of a plurality of digital picture frames 10 to 10*n*, 10' via a communications link, such as a network connection. The at least one digitized image is transferred either wirelessly (to DPFs 10 and 10*n* as shown by FIG. 1) or non-wirelessly (to DPF 10' as shown by FIG. 1).

Each of the digital picture frames 10 to 10*n*, 10' shown by FIG. 1 is capable of receiving DPF print job commands (or digital multimedia presentation appliance print job commands) for processing and displaying images. As such, reference to a particular DPF in the following description for performing the steps of processing and displaying images can be performed by one of the other DPFs.

The system 100 can also include a customization storage capable device 50, such as one incorporating a database, as further described below and a printer 60, such as a xerographic printer, and other peripherals commonly connected to a computing device 12.

DPF 10 has a user interface which includes a display 14 for displaying the at least one digitized image and a keypad 16, a processor 18, and a memory module 20 configured to store digitized images capable of being displayed by the display 14 as well as other data, such as instructions configured for execution by the processor 18 for performing various functions, such as processing the DPF print job command. The instructions can also be part of a software application program downloaded to the processor 18 from the computing device 12.

It is contemplated that the memory module 20 can be integrated with the processor 18. It is further contemplated that the memory module 20 can include an external memory module, such as a removable memory card, flash memory module, or remote storage location accessible via wireless or non-wireless communication, capable of being connected to the DPF 10. It is also contemplated that the display can be a touch screen display, an LCD, plasma display or any other display technology capable of displaying digitized images.

The keypad 16 of the user interface includes a plurality of keys for enabling a user to interact with the DPF 10. The keypad 16 can further include a wireless keypad on a remote control unit and/or remote control via web interface and/or voice recognition. The keypad 16 can be used to scroll through several digitized images stored within the memory module 20, change the display format, zoom in and out, change the display orientation (portrait to landscape, and vice versa), etc. The keypad 16 can alternatively or additionally be provided on the display 14, where the display 14 is arranged to be a touch screen display, for enabling a user to touch the virtual keys of the keypad 16 as displayed by the touch screen display for performing the functions described in the previous sentence.

One of the keys of the keypad 16 can include an image transfer key 16A which after being pressed, the processor 18 executes a series of instructions which causes the DPF 10 to display a query to the user to select a peripheral connected to the DPF 10, such as at least one other DPF, the printer 60, the storage capable device 50 and/or the computing device 12, and a task to be performed by the selected peripheral. The task can include for the selected peripheral to display, print a hard copy, and/or store the image to be transferred.

After the user makes his selections using the keypad 16, the processor 18 transfers the pre-selected image or the image currently being displayed by the display 14 to the one or more selected peripherals with an accompanying instruction command. The instruction command can be a DPF print job command as defined herein if the selected peripheral is one or more DPFs and/or the computing device 12, a standard print job command to print a hard copy if the selected peripheral is the printer 60, and a storage command to store the image if the selected peripheral is the storage capable device 50 and/or the computing device 12.

Additionally, the keypad 16 may include a thumbnail key 16B for displaying images stored by the memory module 20 as a set of thumbnails, such as a thumbnail array. The thumbnail array may be partially displayed by the display 14 and the user can scroll up and down to view the non-displayed portions of the thumbnail array using scrolling keys of the keypad 16.

The keypad 16 can further include programming keys 16C for programming the DPF 10 to display images based on different variables, such as time and geography. For example, the DPF 10 can be programmed to display images stored by the memory module 20 according to timer or clock settings. An image can be displayed, for example, every fifteen minutes for two minutes, or an image can be displayed according to a system clock, such as at 2:00 pm on Thursday, April 15. Accordingly, the display 14 is enabled based on the timer or clock settings.

The system clock can be the internal system clock of the computing device 12 or the internal system clock of the DPF 10. If it is the internal system clock of the computing device 12, after the user uses the keypad 16 to set the clock setting, the processor 18 communicates the clock setting to the computing device 12. A processor 22 of the computing device is then programmed to transmit a DPF print job command to the DPF 10 when the internal system clock of the computing device clocks the programmed clock setting.

The DPF print job command can include instructions for deleting an image transferred to and displayed by the DPF 10 after a given time. Deletion of the image could occur automatically or require intervention by a user. It is contemplated that a countdown expiration timer could be displayed on the display 14 of the DPF 10 to alert the user of the impending deletion of the displayed image.

With respect to geography, the processor 18 of the DPF 10 can be programmed to use location based technology by equipping the DPF 10 with a location based device, such as a GPS device, in operative communication with the processor 18 for displaying images based on the geographical location of the DPF 10 as determined by a location based service in communication with the location based device. That is, the display 14 is enabled in accordance with the geographical location of the DPF 10. Alternatively, the computing device 12 can be in operative communication with a local location based device, such as a GPS device, and the computing device 12 is programmed to use location based technology to generate and wirelessly transmit a DPF print job command to the DPF 10' based on the geographical location of the computing device 12 as determined by the local location based device. The geographical location in the first scenario is programmed within the processor 18 of the DPF 10; the geographical location in the second scenario is programmed within the processor 22 of the computing device 12. Geographic dependent information and images can be stored in the memory module 20 and the configuration stored in the storage capable device 50.

Figure 2A:
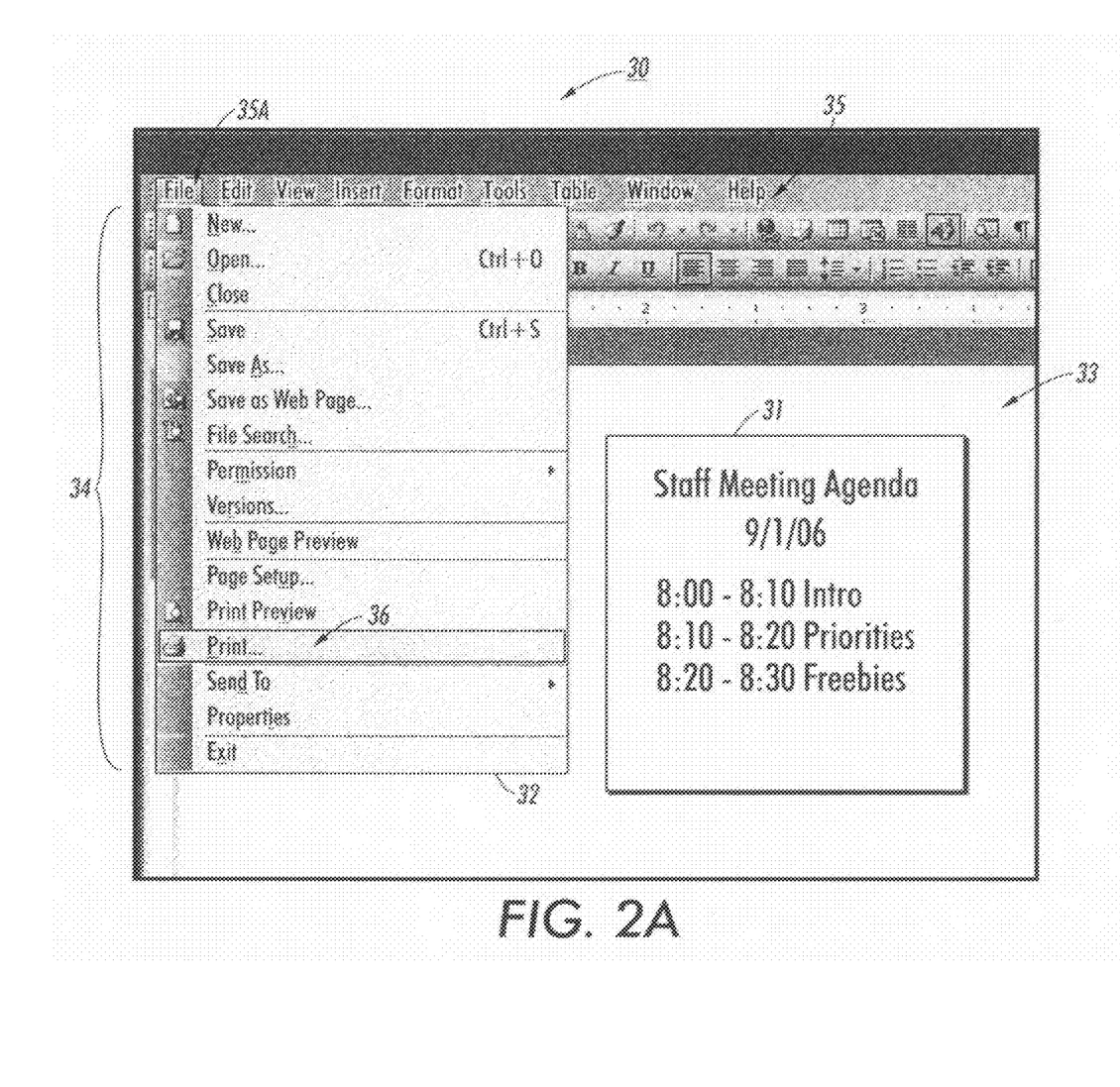
FIG. 2A is a screen view corresponding to a software application program showing a task window which includes a printing utility in accordance with the present disclosure.

With reference to FIG. 2A, the processor 22 of the computing device 12 is configured to execute a software application program, such as Microsoft Word, having screen view 30. Screen view 30 can optionally display an image 31 which can be text or graphics in area 33, and a plurality of pull down windows as known in the art, including pull down window 32, after selection of the FILE icon 35A displayed by tool taskbar 35. Pull down window 32 includes a plurality of task utilities 34, including a printing utility 36. In FIG. 2A, image 31 depicts a staff meeting agenda.

Figure 2B:
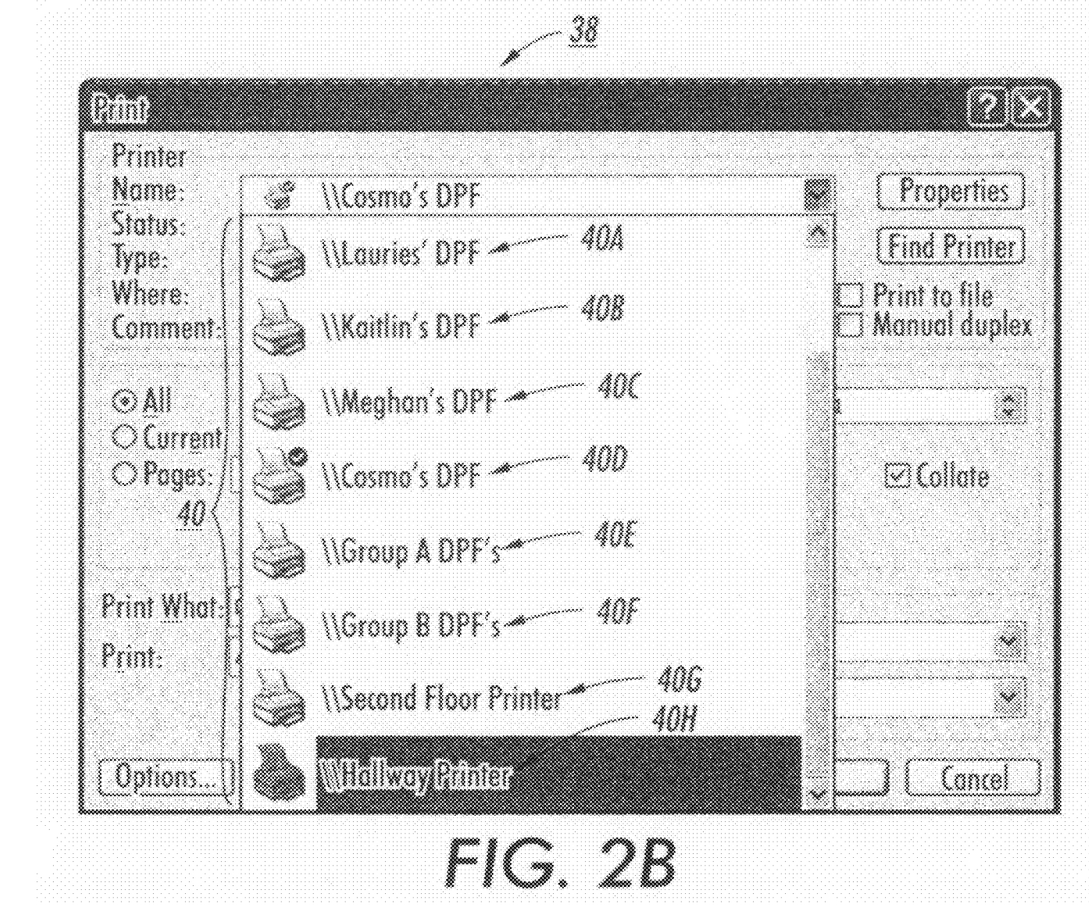
FIG. 2B illustrates a window listing a plurality of peripherals and their corresponding icons for printing thereto after selection of the printing utility shown by FIG. 2A in accordance with the present disclosure.
Figure 3:
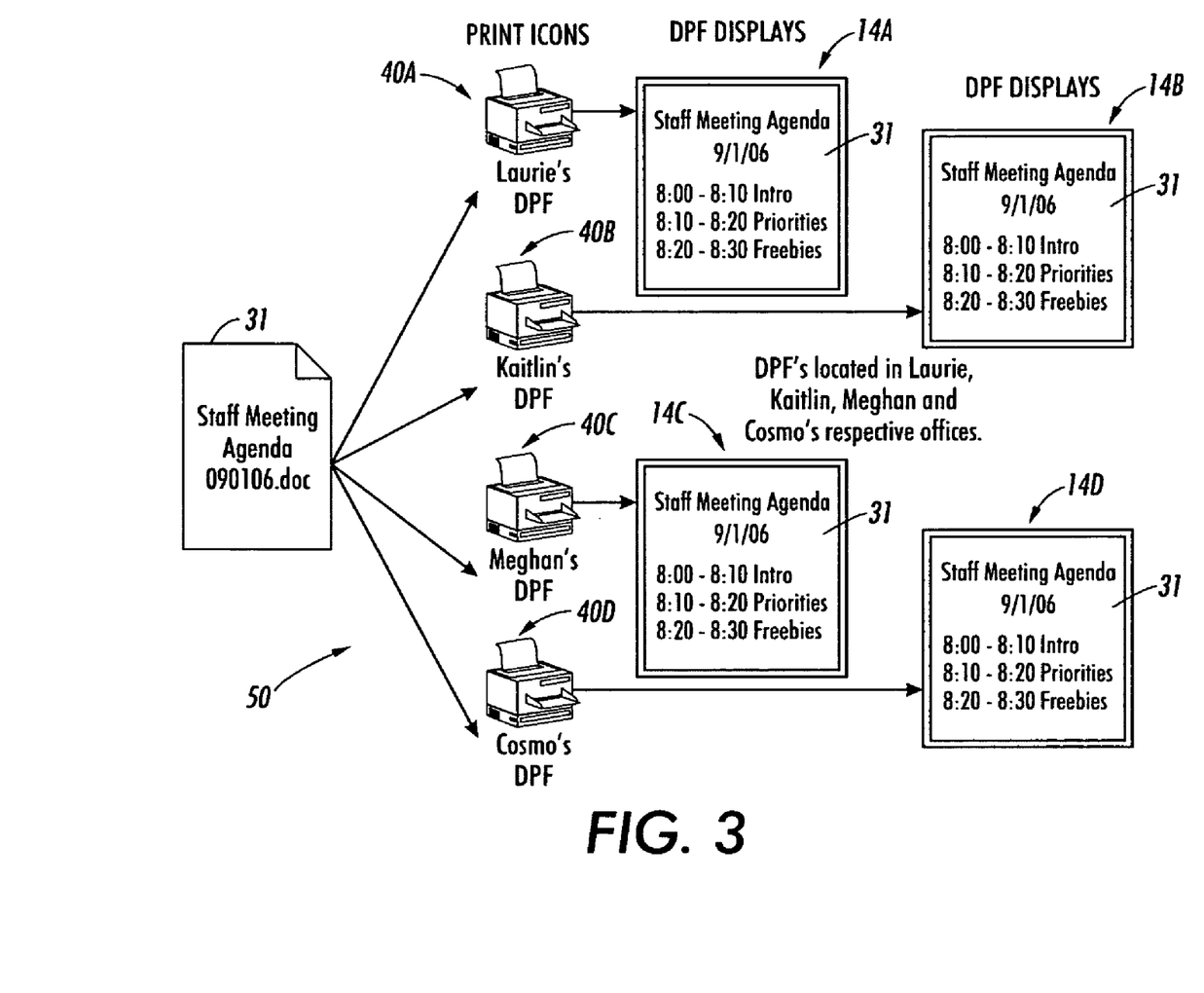
FIG. 3 is a schematic illustration showing printing of at least one digitized image to at least one display of a digital multimedia presentation appliance in accordance with the present disclosure.

After selection of the printing utility 36, window 38 shown by FIG. 2B is overlaid over screen view 30. Window 38 includes a listing of a plurality of peripheral options or icons 40 for printing the image 31 (listing of available printers). The listing 40 includes individual DPF printing options or icons 40A-40D for selecting and thereby transmitting DPF print job commands to one or more DPFs corresponding to the icons 40A-40D for processing and displaying images on the DPF displays 14. Icon 40A provides for transmitting a DPF print job command for display of an image on a display 14A (as show in FIG. 3) corresponding to Laurie's DPF. Icon 40B provides for transmitting a DPF print job command for display of an image on a display 14B (as shown in FIG. 3) corresponding to Kaitlin's DPF. Icon 40C provides for transmitting a DPF print job command for display of an image on a display 14C (as shown in FIG. 3) corresponding to Meghan's DPF. Icon 40D provides for transmitting a DPF print job command for display of an image on a display 14D (as shown in FIG. 3) corresponding to Cosmo's DPF. Icon 40E provides for transmitting a DPF print job command for display of an image on displays 14A and 14B corresponding to Group A DPFs, i.e., Laurie's and Kaitlin's DPF; and icon 40F provides for transmitting a DPF print job command for display of an image on displays 14A, 14B, 14C and 14D corresponding to Group B DPFs, i.e., Laurie's, Kaitlin's, Meghan's and Cosmo's DPF (see FIG. 2B). Icons 40G and 40H provide for transmitting a standard print job command for standard printing by a printer located on the second floor and a printer located in the hallway, respectively.

A DPF corresponding to a particular individual means that the display of the DPF is associated with that individual. For example, the DPF may be located in the individual's office, general work area, or home.

After the user selects one of the individual DPF printing icons 40A-40D or one of the groups of DPF printing icons 40E and 40F to print thereto, a DPF print job command is transmitted by the processor 22 of the computing device 12. The DPF print job command when processed by the processor 18 of the one or more DPFs provides for processing and displaying the image 31.

An example of such a printing workflow will now be described with reference to FIGS. 2A, 2B and 3. Image 31 is shown on the left of FIG. 3 and corresponds to a text document of the staff meeting agenda. The user wants the display 14A of Laurie's DPF to display image 31, i.e., the user wants to print to Laurie's DPF. Hence, the user selects FILE icon 35A from the tool taskbar 35 shown by FIG. 2A and subsequently selects printing utility 36 to display window 38 shown by FIG. 2B. The user then selects Laurie's DPF option 40A to print to Laurie's DPF.

The user then wants to print to Kaitlin's DPF. The user therefore repeats the process, but this time selects Kaitlin's DPF option 40B displayed by window 38 to print to Kaitlin's DPF shown by FIG. 3. The user then wants to print to Meghan's DPF. The user therefore repeats the process but this time selects Meghan's DPF option 40C displayed by window 38 to print to Meghan's DPF shown by FIG. 3. The user then wants to print to Cosmo's DPF. The user therefore repeats the process but this time selects Cosmo's DPF option 40D displayed by window 38 to print to Cosmo's DPF shown by FIG. 3.

The above described workflow process could have been simplified had the user selected Group B DPFs printing option or icon 40F displayed by window 38, since selection of this icon causes the DPF print job command to be simultaneously transmitted to Laurie's DPF, Kaitlin's DPF, Meghan's DPF and Cosmo's DPF. As such, the selection of icons 40E and 40F enable a user to easily and quickly manage the distribution of documents which are printed, i.e., transferred and displayed, to a plurality of DPFs 10 using the printing utility 36 available in most software application programs.

The selected icon causes the processor 22 of the computing device 12 to execute a software application for transmitting the DPF print job command to the DPF or DPFs corresponding to the selected icon. The DPF print job command instructs the corresponding DPF(s) receiving the DPF print job command to process and display the image transmitted along (or not along) with the DPF print job command as mentioned above. Alternatively, the processor 22 transmits a standard print job command as one ordinarily transmitted to a printer after selection of a DPF icon 40A-40F and the DPFs execute a software application after receiving the standard print job command. The software application translates the standard print job command to a DPF print job command which provides for processing and displaying the image transmitted along (or not along) with the standard print job command (instead of printing the image).

Figure 4:
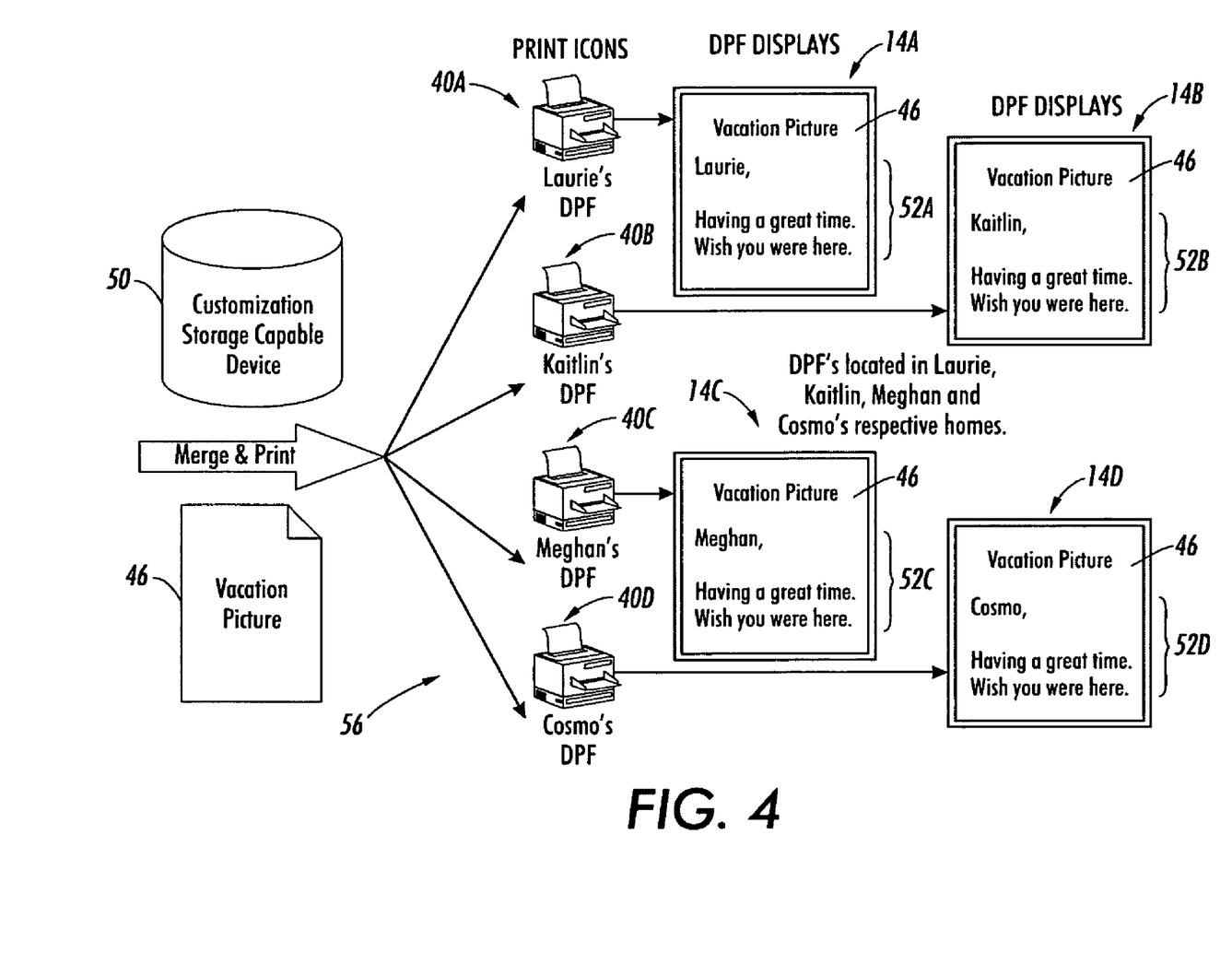
FIG. 4 is a schematic illustration showing customization by a storage capable device incorporating a database, or other suitable data structure, and printing to at least one display of a digital multimedia presentation appliance at least one digitized image in accordance with the present disclosure.

With reference to FIG. 4, another workflow process according to the present disclosure will now be described. The workflow process shown by FIG. 4 entails printing, i.e., transferring and displaying an image 46, to displays 14A-14D of the various DPFs where a different message 52A-52D is transmitted along with the image 46 (and DPF print job command) and overlays the image 46 displayed by each respective display 14A-14D. It is contemplated that each of the different messages 52A-52D can be integrated with the image 46 to form four integrated images each being respectively transferred to one of the DPFs by the DPF print job commands.

In the workflow process shown by FIG. 4, the software application program executed by the processor 22 of the computing device 12 provides for creating the customized messages 52A-52D using the customization storage capable device 50 or by simply typing in the customized message 52A-52D for each respective DPF prior to selecting the individual DPF printing icons 40A-40D for generating and transmitting the DPF print job commands.

With reference to FIG. 1 and FIG. 4, RFID technology is used for security measure, each of the DPFs is optionally provided with an RFID sensor 54 for sensing an RFID tag in proximity to the RFID sensor 54. The RFID tag is worn, for example, by individuals, such as, Laurie, Kaitlin, Meghan and Cosmo. If the individual moves away from his or her respective DPF, the RFID sensor 54 will no longer sense the RFID tag and will transmit a signal to the processor 18 to disable the display 14, such as one of the displays 14A-14D. The display 14 will then be disabled to prevent other individuals from viewing an image displayed by the display 14.

When the individual returns to the area in proximity to the DPF, the RFID sensor 54 will sense the RFID tag and transmit a signal to the processor 18 to enable the display 14. The display will then be enabled and the image will be displayed by the display 14. It is contemplated that the RFID sensor 54 is removable from the DPF 10 Other security measures are contemplated within the scope of the present disclosure for enabling and disabling the display 14; for example, using biometrics, such as voice recognition, retinal scan, fingerprints, etc., to enable and disable the display 14 as known in the art, or transmitting a security key along with the image and the DPF print job command. The processor 18 determines if the security key is a legitimate security key using one or more algorithms, such as an algorithm to compare the received security key with a stored security key. If the security key is a legitimate security key, the processor 18 processes and displays the image on the display 14. It is contemplated that the security key can be transmitted to the DPF 10 wirelessly or non-wirelessly. In the case of wirelessly, the security key along with the image and the DPF print job command can be transmitted from a mobile device, such as a PDA and cellular phone.

The DPF 10 and system 100 of the present disclosure can find uses in a plurality of applications. For example, the DPF 10 may be utilized in retail stores for displaying advertisements or discounts; in restaurants for displaying menus based on time settings; and in hotel rooms for displaying an individual's itinerary, family pictures, etc. to provide the individual with a sense of being at home or at his office, or local attractions based on location settings.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A digital multimedia presentation appliance comprising:
   a display;
   an interface configured for interfacing the digital multimedia presentation appliance with a computing device; and
   a processor configured to receive a multimedia presentation appliance print job command via the interface from an external processor of the computing device, said external processor capable of executing a printing utility, generating the multimedia presentation appliance print job command following selection of the printing utility, and transmitting the multimedia presentation appliance print job command to the digital multimedia presentation appliance to print the at least one digitized image, said multimedia presentation appliance processor configured to execute a program for processing the multimedia presentation appliance print job command corresponding to the at least one digitized image and displaying the at least one digitized image by the display of the multimedia presentation appliance, wherein the external processor is in operative communication with another display displaying the at least one digitized image at least prior to the selection of the printing utility.

2. The digital multimedia presentation appliance according to claim 1, wherein the multimedia presentation appliance print job command is transmitted to the multimedia presentation appliance in response to the selection of a printing identifier presented by the printing utility, the printing identifier corresponding to at least the multimedia presentation appliance.

3. The digital multimedia presentation appliance according to claim 1, further comprising a memory module configured to store the at least one digitized image capable of being displayed by the display of the multimedia presentation appliance.

4. The digital multimedia presentation appliance according to claim 3, wherein the memory module is one of a part of the processor and a separate unit in operative communication with the processor.

5. The digital multimedia presentation appliance according to claim 1, further comprising means for enabling the display for displaying the at least one digitized image.

6. The digital multimedia presentation appliance according to claim 5, wherein said means is selected from the group consisting of biometrics, a timer, geographic location determining and RFID technology.

7. The digital multimedia presentation appliance according to claim 1, further comprising a location based device in operative communication with the processor for displaying images based on the geographical location of the multimedia presentation appliance.

8. The digital multimedia presentation appliance according to claim 1, wherein the digital multimedia presentation appliance is selected from the group consisting of digital picture frames, digital televisions and computer monitor displays.

9. A digital multimedia presentation appliance printing system comprising:
   at least one multimedia presentation appliance comprising a display for displaying at least one digitized image and a processor; and
   a computing device comprising a computing device processor in operative communication with the at least one multimedia presentation appliance via a communications link, said computing device processor configured for executing instructions of a software application program for generating a multimedia presentation appliance print job command and transmitting the multimedia presentation appliance print job command to the at least one multimedia presentation appliance via the communications link following selection of a printing utility;
   wherein said processor of the at least one multimedia presentation appliance is configured to receive the multimedia presentation appliance print job command, process the multimedia presentation appliance print job command and display the at least one digitized image corresponding to the multimedia presentation appliance print job command on the display of the at least one multimedia presentation appliance.

10. The digital multimedia presentation appliance printing system according to claim 9, wherein the multimedia presentation appliance print job command is transmitted to the at least one multimedia presentation appliance in response to the selection of a printing icon presented by the printing utility, the printing icon corresponding to at least the at least one multimedia presentation appliance.

11. The digital multimedia presentation appliance printing system according to claim 9, wherein the at least one multimedia presentation appliance comprises a memory module configured to store the at least one digitized image capable of being displayed by the display of the at least one multimedia presentation appliance.

12. The digital multimedia presentation appliance printing system according to claim 11, wherein the memory module is one of a part of the processor of the at least one multimedia presentation appliance and a separate unit in operative communication with the processor of the at least one multimedia presentation appliance.

13. The digital multimedia presentation appliance printing system according to claim 9, wherein the at least one multimedia presentation appliance comprises means for enabling the display for displaying the at least one digitized image.

14. The digital multimedia presentation appliance printing system according to claim 13, wherein said means is selected from the group consisting of biometrics, a timer, geographic location determining and RFID technology.

15. The digital multimedia presentation appliance printing system according to claim 9, wherein the at least one multimedia presentation appliance comprises a location based device in operative communication with the processor of the at least one multimedia presentation appliance for displaying images based on the geographical location of the at least one multimedia presentation appliance.

16. The digital multimedia presentation appliance printing system according to claim 9, further comprising means for customizing the at least one digitized image prior to display by the at least one multimedia presentation appliance.

17. The digital multimedia presentation appliance printing system according to claim 9, wherein the at least one digital multimedia presentation appliance is selected from the group consisting of digital picture frames, digital televisions and computer monitor displays.

18. A method for displaying at least one digitized image on a display of a digital multimedia presentation appliance, the method comprising:
    executing a printing utility on a computing device in operative communication with the digital multimedia presentation appliance;
    displaying at least a multimedia presentation appliance printing icon corresponding to the multimedia presentation appliance on a display of the computing device;
    selecting the multimedia presentation appliance printing icon corresponding to the multimedia presentation appliance;
    generating a multimedia presentation appliance print job command corresponding to the at least one digitized image;
    transmitting the multimedia presentation appliance print job command to the multimedia presentation appliance via a communications link;
    receiving the multimedia presentation appliance print job command corresponding to the at least one digitized image by a processor of the multimedia presentation appliance;
    processing the multimedia presentation appliance print job command by the processor of the multimedia presentation appliance; and
    displaying the at least one digitized image corresponding to the multimedia presentation appliance print job command on the display of the multimedia presentation appliance.

19. The method according to claim 18, further comprising controlling display of the at least one digitized image on the display.

20. The method according to claim 18, wherein the step of displaying the at least one digitized image includes determining whether to display the at least one digitized image based on one of the geographical location of the multimedia presentation appliance and a programmed time setting.

21. The method according to claim 18, further comprising customizing the at least one digitized image prior to the displaying step.

22. The method according to claim 18, further comprising storing the at least one digitized image within a memory module of the multimedia presentation appliance.

23. The method according to claim 18, wherein the digital multimedia presentation appliance is selected from the group consisting of digital picture frames, digital televisions and computer monitor displays.

* * * * *